United States Patent
Chang et al.

(10) Patent No.: US 9,009,363 B2
(45) Date of Patent: Apr. 14, 2015

(54) METHODS FOR PROVIDING AND INDICATING STORAGE LOAD INDEXES

(75) Inventors: Yee-Hsiang Sean Chang, Cupertino, CA (US); Yiqiang Ding, San Jose, CA (US); John S. Hoch, Palo Alto, CA (US)

(73) Assignee: Rasilient Systems, Inc., Santa Clara, CA (US)

( * ) Notice: Subject to any disclaimer, the term of this patent is extended or adjusted under 35 U.S.C. 154(b) by 998 days.

(21) Appl. No.: 12/815,393

(22) Filed: Jun. 14, 2010

(65) Prior Publication Data

US 2010/0315255 A1 Dec. 16, 2010

Related U.S. Application Data

(60) Provisional application No. 61/186,803, filed on Jun. 12, 2009.

(51) Int. Cl.
*G06F 3/00* (2006.01)
*G06F 5/00* (2006.01)
*G06F 12/00* (2006.01)
*G06F 13/00* (2006.01)
*G06F 11/00* (2006.01)
*H04L 29/08* (2006.01)
*H04L 29/14* (2006.01)

(52) U.S. Cl.
CPC ............... *H04L 67/36* (2013.01); *H04L 69/40* (2013.01); *H04L 67/1097* (2013.01)

(58) Field of Classification Search
CPC ............ H04N 19/00127; H04N 19/0003; H04N 21/6587; H04N 19/00266; H04N 19/00327; H04N 21/44004; H04N 21/632; H04N 19/00715; H04N 19/00854; H04N 19/00545; H04N 7/181; H04N 19/00; H04N 19/00121; H04N 19/00169; H04N 19/00921
USPC ............ 710/19; 711/114, 141, 162, 170, 144, 711/156; 714/48; 370/390; 375/240.01; 348/211.8; 386/350

See application file for complete search history.

(56) References Cited

U.S. PATENT DOCUMENTS

| | | | | |
|---|---|---|---|---|
| 5,592,622 | A * | 1/1997 | Isfeld et al. | 709/207 |
| 6,243,756 | B1 * | 6/2001 | Whitmire et al. | 709/232 |
| 6,697,365 | B1 * | 2/2004 | Messenger | 370/390 |
| 7,257,158 | B1 * | 8/2007 | Figueredo et al. | 375/240.01 |
| 7,421,625 | B2 * | 9/2008 | Bhesania et al. | 714/57 |
| 7,475,294 | B2 * | 1/2009 | Maki et al. | 714/48 |
| 7,484,058 | B2 * | 1/2009 | Frey et al. | 711/162 |
| 7,617,365 | B2 * | 11/2009 | Zhang et al. | 711/141 |
| 7,818,531 | B2 * | 10/2010 | Barrall | 711/170 |
| 7,869,699 | B2 * | 1/2011 | Mate et al. | 386/278 |
| 7,873,782 | B2 * | 1/2011 | Terry et al. | 711/114 |
| 7,877,776 | B2 * | 1/2011 | Krikorian et al. | 725/95 |
| 8,004,572 | B2 * | 8/2011 | Figueredo et al. | 348/211.8 |
| 8,559,798 | B2 * | 10/2013 | Aoki et al. | 386/350 |

* cited by examiner

*Primary Examiner* — Farley Abad
*Assistant Examiner* — Henry Yu
(74) *Attorney, Agent, or Firm* — Venture Pacific Law, PC

(57) ABSTRACT

A method for indicating an overload condition of a data storage system, comprises the steps of: defining one or more load indexes, wherein each of the load indexes has an overload threshold; and if one of the load indexes has met its respective overload threshold, providing an indicator of the overload condition of the storage system, else, monitoring the load indexes.

20 Claims, 2 Drawing Sheets

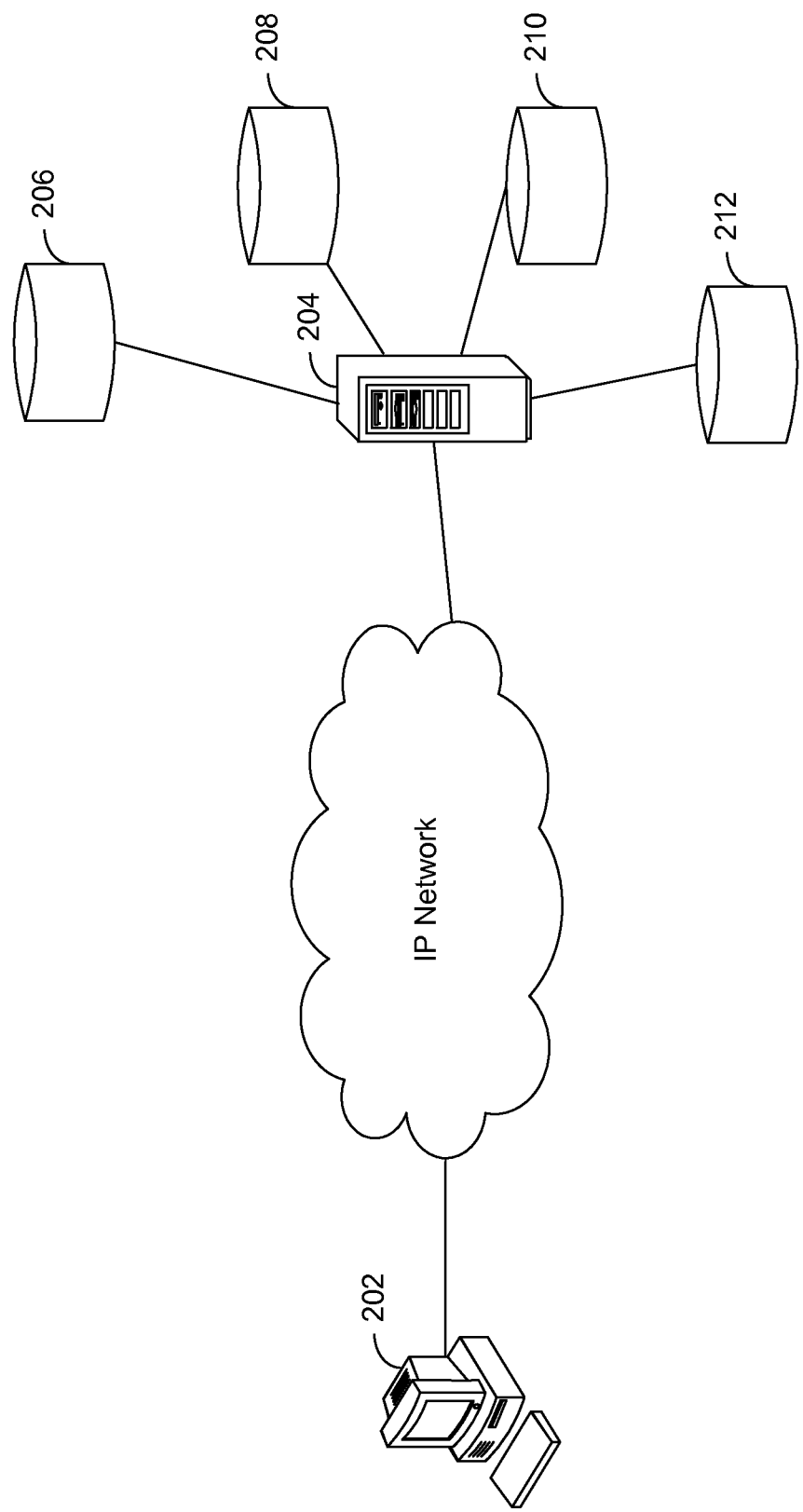

METHODS FOR PROVIDING AND INDICATING STORAGE LOAD INDEXES

CROSS REFERENCE

This application claims priority from a provisional patent application entitled "Methods to Provide and Display Storage Load Indexes" filed on Jun. 12, 2009 and having an Application No. 61/186,803. Said application is incorporated herein by reference.

FIELD OF INVENTION

This invention relates to methods for indicating a data storage system overload and, in particular, to methods for providing load indexes to be displayed to a user of the data storage system.

BACKGROUND

Traditional storage systems are designed for general data applications, e.g., database applications, email applications, file applications, or other information technology ("IT") applications. The data pattern of these data applications is bursty and very application dependent. A concept of the amount of "load" on the storage system does not exist. Furthermore, there is no indication of whether the system has reached its limits. There may be performance indexes, e.g., read and write bandwidth, read and write input/output ("I/O") latencies, and cache performance, such as cache hit ratio. These indexes reflect how the system is performing, but they do not indicate whether the system is overloaded. It is understandable that load indexes do not exist for general data applications since load indexes are difficult to define. Historically, IT devices, including servers, networking devices, and storage devices, implement best effort algorithms to receive, transmit, and store data with very little transparency to a user (e.g., application developers, solution integrators, system architects, system administrators, or other users) as to whether the storage system is overloaded.

For bursty traffic in general data applications, temporary congestion may have little impact to the overall data application requirements. However, load indexes are essential for rich media applications or applications that require a specific level of quality of service ("QOS"). For example, in video surveillance with hundreds of IP cameras storing data into a data storage system, it is important to know whether the data storage system is keeping up with the load or whether the limit has been reached and frames are dropped. If the limit has been met, then frames are dropped without the user being alerted to the situation.

Therefore, it is desirable to provide methods for indicating load indexes for a data storage system to a user for monitoring the load on the data storage system.

SUMMARY OF INVENTION

An object of this invention is to provide methods for providing one or more load indexes to indicate the load on a data storage system to a user.

Another object of this invention is to provide methods for alerting a user of a data storage system to an overload of the data storage system.

Briefly, the present invention relates to a method for indicating an overload condition of a data storage system, comprising the steps of: defining one or more load indexes, wherein each of the load indexes has an overload threshold; and if one of the load indexes has met its respective overload threshold, providing an indicator to a user of the storage system, else, monitoring the load indexes.

An advantage of this invention is that methods are provided for providing one or more load indexes to indicate the load on a data storage system to a user.

Another advantage of this invention is that methods are provided for alerting a user of a data storage system to an overload of the data storage system.

DESCRIPTION OF THE DRAWINGS

The foregoing and other objects, aspects, and advantages of the invention will be better understood from the following detailed description of the preferred embodiment of the invention when taken in conjunction with the accompanying drawings in which:

FIG. 2 illustrates a data storage system comprising a computer system and a plurality of data storage devices connected via an iSCSI interface.

DETAILED DESCRIPTION OF THE PREFERRED EMBODIMENTS

Figure 1:
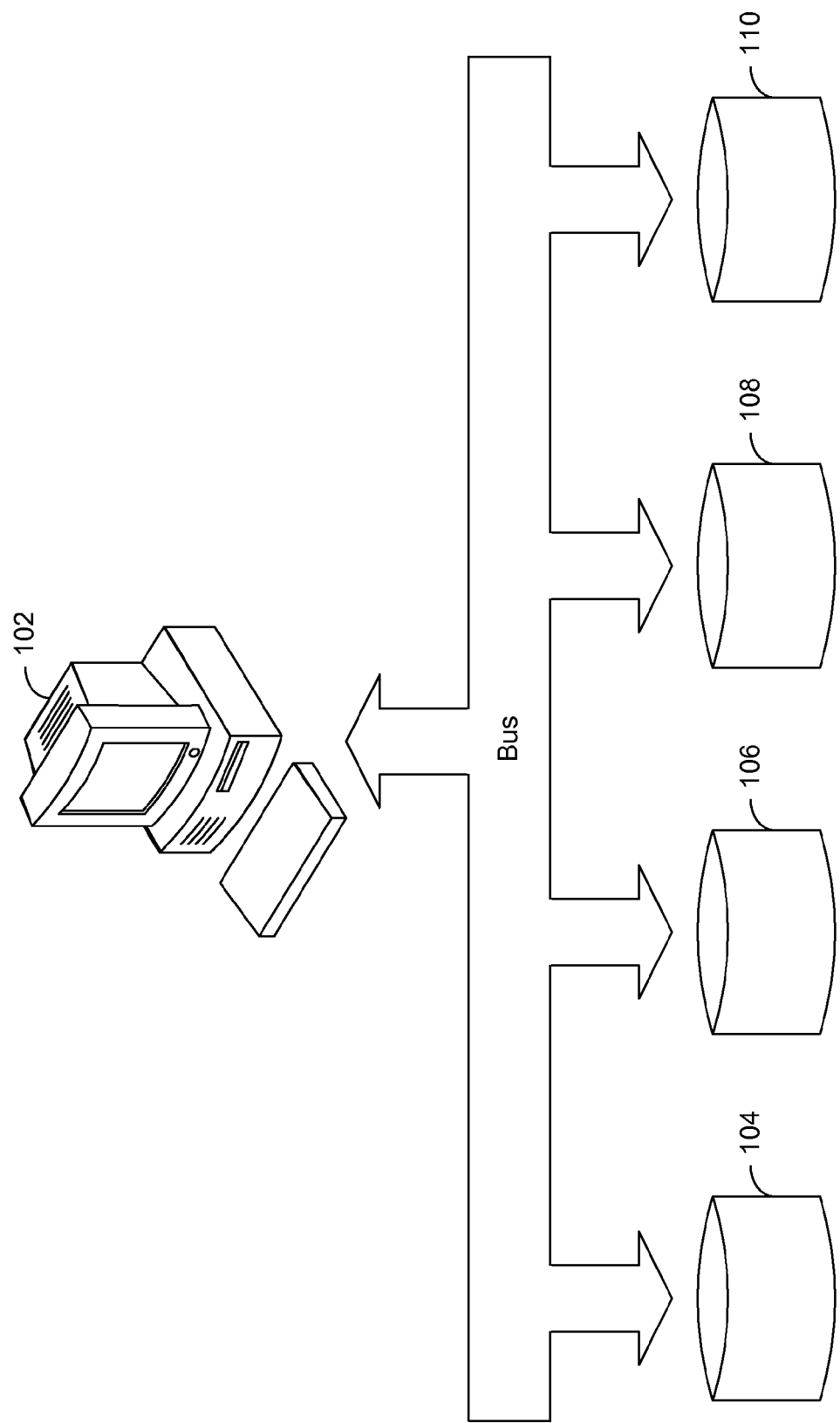
FIG. 1 illustrates a data storage system comprising a computer system and a plurality of data storage devices connected via a SCSI interface.

It is important to note that the present invention applies to a data storage system that may use a variety of technologies to connect a computer with one or more data storage devices. Such technologies may include, small computer system interface ("SCSI"), internet SCSI ("iSCSI"), and other interface technologies. In order to aid in the description of the invention, the present invention may be described in relation to SCSI and iSCSI, but it is to be understood that the present invention may apply to a data storage system using other device interface technologies. Furthermore, since the SCSI and iSCSI technologies are widely known technologies, details with respect to these technologies may not be discussed.

Generally, load indexes of the present invention can represent limits of the data storage system, such limits can stem from one or more of the following, RAID controllers, CPU resources, cache memory, network speed, storage drive speed, data storage capacity, memory storage density, data storage I/O latency, data storage throughput, data storage energy requirements, total data bandwidth for transmitting and receiving, and other limitations of the data storage system. The load indexes can be defined by a user to monitor specific limits for the load on the data storage system. For instance, a load index may be used to represent the percentage of the cache memory in use. Another load index may be used to represent multiple limitations, such as, the data storage latency and the data storage throughput.

Once the load indexes for the storage system are defined, each load index may have an overload threshold to determine whether the storage system is overloaded. The overload threshold can be set by a user to monitor specific load requirements for the data storage system. If an overload threshold is met for one of the load indexes, then an indicator (e.g., a warning message) can be displayed to alert the user. For example, if the load index represents the percentage of the cache memory in use, then the overload threshold can be set to the condition when the cache memory is more than eighty percent filled. When the cache memory of the storage system exceeds eighty percent filled, then a message is displayed alerting the user. Additionally, the user may set the load indexes to be displayed periodically or at set times, regardless of whether the overload threshold is met.

Depending on the program being used by the user, the load index can be displayed on a computer management system, including a command line interface ("CLI"), a graphical user interface ("GUI"), a management interface, such as SNMP, a system alert, or other computer management systems.

Furthermore, an external indicator light can also be disposed on the data storage system. When an overload threshold for one of the load indexes is met, then the indicator light can be lit to alert the user. The indicator light can be flashed a preset number of times to differentiate which one or more of the load indexes have met their respective overload threshold. For instance, if a first load index and a second load index have met their respective overload threshold, then one flash of the indicator light is activated to indicate that the overload threshold of the first load index has been met, followed by a pause for a preset amount of time, further followed by two flashes of the indicator light to indicate that the overload threshold of the second load index has been met, then followed by the pause, and the cycle restarting at one flash of the indicator light to indicate that the overload threshold of the first load index is met. During the pause, the indicator light may turn off, turn on with no flashing, or rapidly flash (e.g., at ten to one hundred times the frequency of the indicator light flashing to indicate an overload threshold). The rapid flashing can aid in quickly getting the attention of the user that an overload condition has been met. Even more so, to aid in quickly identifying which overload threshold is met, the indicator lights may also be different colors.

Additionally, instead of a single indicator light, multiple indicator lights may be implemented such that each indicator light may indicate a different overload threshold. The plurality of the load indexes that have met their respective overload threshold can have a one to one correspondence with the multiple indicator lights on the data storage system.

In an embodiment of the present invention, the data storage system of the present invention can be implemented using a SCSI interface to couple a computer system with one or more data storage devices. A load index for the data storage system can represent a busy response signal from a data storage device.

FIG. 1 illustrates a data storage system comprising a computer system and a plurality of data storage devices connected via a SCSI interface. A computer system 102 is connected to data storage devices 104-110 via a bus. Generally, communications are provided between the computer system 102 and the data storage devices 104-110 through a SCSI interface using a SCSI protocol, a request-response protocol.

According to the SCSI protocol, the communication takes place between an initiator (e.g., the computer system 102) and a target (e.g., one of the data storage devices 104-110). The initiator sends a SCSI command (e.g., read command or write command) to the target which then responds. One of the return codes for the SCSI response is a busy return code, which is used to slow down the initiator from requesting further reads and/or writes. The number of busy return codes received by the initiator can be used to indicate the load on the target.

For example, if five hundred SCSI write commands are sent down from the initiator in a predefined amount of time (e.g., five seconds), the number of busy return codes generated by the target can be displayed to the user. Furthermore, the number of busy return codes can be updated with a current value every predefined amount of time and displayed to the user. In this manner, the user can have a valuable metric to gauge whether the data storage system is overloaded.

In another embodiment of the present invention, the data storage device may return a SCSI queue full return code. This return code is similar to the SCSI busy return code in that it can be used to slow down the initiator. Thus, the number of SCSI queue full return codes received in a predefined amount of time can also be displayed to the user to allow the user to determine whether the storage system is overloaded.

According to the SCSI standard, it is not mandatory for the target to respond with a busy or queue full return code. Another option for the target is to not respond at all. In this case, the initiator can timeout the I/O command and resend the I/O command. Thus, one of the load indexes can be the number of timeouts in a predefined amount of time. The number of timeouts can be displayed to the user to indicate to the user of a possible overload of the storage system. Alternatively, the number of timeouts in a predefined amount of time can be displayed to the user when the number exceeds an overload threshold value.

In yet another embodiment of the present invention, a load index can also be used to represent a network flow control mechanism (e.g., transmission control protocol ("TCP") flow control, fibre channel ("FC") flow control, ethernet flow control, iSCSI flow control, or other network flow control). Generally, network flow control is the process of managing the rate of data transmission between two network nodes to prevent a fast sender from overloading a slow receiver. A warning message stating the network flow control mechanism is activated can be displayed on the target's display or on the initiator's display when the network flow control mechanism is engaged.

FIG. 2 illustrates a data storage system comprising a computer system and a plurality of data storage devices connected via an iSCSI interface. A computer system 202 is connected to a server 204 via an IP network (e.g., an IP storage area network or other IP network). The server 204 can access data storage devices 206-212 via a direct connection or a storage area network connection. The computer system 202 and the server 204 communicate through the iSCSI protocol, where the data storage devices 206-212 can be referred to as the logical unit numbers ("LUNs") of the iSCSI target. Thus, the computer system 202 can access the data storage devices 206-212 as if it were directly attached to the data storage devices 206-212.

Since the iSCSI protocol is used over IP networks, an underlining TCP protocol flow control can be used to slow down the traffic from the sender. For instance, one method for a TCP protocol flow control can be to resize the window size. Since the sender sends data according to the window size, the window size can be reduced to limit the amount of data transmitted. If the receiver, e.g., a storage device, reduces the window size, then the traffic from the sender is effectively reduced. However, the user is generally not aware of the window size, thus does not know if the data storage system is overloaded. A message can be displayed to the user that the TCP flow control is engaged. Thereby, the user can be alerted to a possible overload of the storage device.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred methods described herein but all those other and further alterations and modifications as would be apparent to those of ordinary skilled in the art.

We claim:

1. A method for indicating an overload condition of a video data storage system on a display screen to a user, comprising the steps of:
defining one or more load indexes, wherein each of the load indexes has an overload threshold and wherein a certain one of the load indexes indicates whether video frames received by the video data storage system are dropped;
determining the one or more defined load indexes for the video data storage system; and
displaying an indicator on the display screen for select ones of the determined load indexes, wherein the indicator provides a user notification of the dropped video frames, wherein the select ones of the determined load indexes have met the respective overload threshold,
wherein the determined load indexes are recalculated every predefined amount of time, and
wherein the indicator is adjusted as a function of the recalculated load indexes.

2. The method for indicating an overload condition of a data storage system of claim 1, wherein in the displaying step, the indicator is displayed on a computer management system, wherein the computer management system is remotely located from a storage device of the video data storage system, wherein cameras are located at the remote location of the computer management system, and wherein the cameras transmit the video frames to the video data storage system via a network.

3. The method for indicating an overload condition of a data storage system of claim 1, wherein in the displaying step, the indicator is an external light on the data storage system and wherein the external light is activated when one of the select ones of the load indexes has met its respective overload threshold.

4. The method for indicating an overload condition of a data storage system of claim 1, wherein in the defining step, one of the load indexes is the number of SCSI busy return codes received in a first predefined amount of time.

5. The method for indicating an overload condition of a data storage system of claim 1, wherein in the defining step, one of the load indexes is the number of SCSI queue full return codes received in a second predefined amount of time.

6. The method for indicating an overload condition of a data storage system of claim 1, wherein in the defining step, one of the load indexes is the number of timeouts to I/O commands in a third predefined amount of time.

7. The method for indicating an overload condition of a data storage system of claim 1, wherein in the defining step, one of the load indexes is cache memory utilization.

8. The method for indicating an overload condition of a data storage system of claim 1, wherein in the defining step, one of the load indexes is a storage device I/O response latency.

9. The method for indicating an overload condition of a data storage system of claim 1, wherein in the defining step, the load indexes comprise one or more of the following: a network flow control, a TCP flow control, a FC flow control, an ethernet flow control, and an iSCSI flow control.

10. The method for indicating an overload condition of a data storage system of claim 3, wherein a plurality of the load indexes have met their respective overload threshold, and wherein each of the plurality of the load indexes that have met their respective overload threshold are identified by a different number of flashes of the external light.

11. The method for indicating an overload condition of a data storage system of claim 3, wherein a plurality of the load indexes have met their respective overload threshold, and wherein each of the plurality of the load indexes that have met their respective overload threshold are identified by a different color of the external light.

12. The method for indicating an overload condition of a data storage system of claim 1, wherein in the displaying step, the indicator is a plurality of external lights on the data storage system and wherein the plurality of external lights are activated when one or more the load indexes have met their respective overload threshold.

13. The method for indicating an overload condition of a data storage system of claim 12, wherein a plurality of the load indexes have met their respective overload threshold, and wherein each of the plurality of the load indexes have a one to one correspondence to the plurality of external lights on the data storage system.

14. The method for indicating an overload condition of a data storage system of claim 1, wherein in the defining step, one of the load indexes is a performance index.

15. A method for indicating an overload condition of a video data storage system on a display screen to a user, comprising the steps of:
defining one or more load indexes, wherein each of the load indexes has an overload threshold and wherein a certain one of the load indexes indicates whether video frames received by the video data storage system are dropped;
determining the one or more defined load indexes for the video data storage system; and
displaying an indicator on the display screen for select ones of the determined load indexes, wherein the indicator provides a user notification of the dropped video frames,
wherein the indicator is displayed on a computer management system,
wherein the computer management system is remotely located from a storage device of the video data storage system,
wherein the select ones of the determined load indexes have met the respective overload threshold,
wherein the determined load indexes are recalculated every predefined amount of time,
wherein the indicator is adjusted as a function of the recalculated load indexes,
wherein cameras are located at the remote location of the computer management system, and
wherein the cameras transmit the video frames to the video data storage system via a network.

16. The method for indicating an overload condition of a data storage system of claim 15, wherein in the displaying step, the indicator is an external light on a computer of the data storage system, wherein the external light is activated when one of the select ones of the load indexes has met its respective overload threshold, wherein a plurality of the load indexes have met their respective overload threshold, and wherein each of the plurality of the load indexes that have met their respective overload threshold are identified by a different number of flashes of the external light.

17. The method for indicating an overload condition of a data storage system of claim 15, wherein in the defining step, the load indexes comprise one or more of the following: a number of SCSI busy return codes received in a first predefined amount of time, a number of SCSI queue full return codes received in a second predefined amount of time, a number of timeouts to I/O commands in a third predefined amount of time, cache memory utilization, a storage device I/O response latency, and a performance index.

18. The method for indicating an overload condition of a data storage system of claim 15, wherein in the defining step, the load indexes comprise one or more of the following: a network flow control, a TCP flow control, a FC flow control, an ethernet flow control, and an iSCSI flow control.

19. A method for indicating an overload condition of a video data storage system on a display screen to a user, comprising the steps of:
   defining one or more load indexes, wherein each of the load indexes has an overload threshold, wherein the load indexes comprise one or more of the following: the number of SCSI busy return codes received in a first predefined amount of time, the number of SCSI queue full return codes received in a second predefined amount of time, the number of timeouts to I/O commands in a third predefined amount of time, cache memory utilization, a storage device I/O response latency, and a performance index and wherein a certain one of the load indexes indicates whether video frames received by the video data storage system are dropped;
   determining the one or more defined load indexes for the video data storage system; and
   displaying an indicator on the display screen for select ones of the determined load indexes, wherein the indicator provides a user notification of the dropped video frames,
   wherein the select ones of the determined load indexes have met the respective overload threshold,
   wherein the determined load indexes are recalculated every predefined amount of time,
   wherein the indicator is adjusted as a function of the recalculated load indexes,
   wherein the indicator is an external light on a computer of the data storage system, wherein the external light is activated when one of the selected ones of the load indexes has met its respective overload threshold, wherein a plurality of the load indexes have met their respective overload threshold, wherein each of the plurality of the load indexes that have met their respective overload threshold are identified by a different number of flashes of the external light,
   wherein cameras are located at the remote location of the computer management system, and
   wherein the cameras transmit the video frames to the video storage system via a network.

20. The method for indicating an overload condition of a data storage system of claim 19, wherein in the defining step, the load indexes further comprise one or more of the following: a network flow control, a TCP flow control, a FC flow control, an ethernet flow control, and an iSCSI flow control.

* * * * *